United States Patent
Manico et al.

(10) Patent No.: US 7,564,480 B2
(45) Date of Patent: Jul. 21, 2009

(54) METHOD OF USING A PORTABLE SYSTEM FOR CAPTURING IMAGES

(75) Inventors: Joseph A. Manico, Rochester, NY (US);
John R. Fredlund, Rochester, NY (US);
Loretta E. Allen, Hilton, NY (US);
David A. Podsedly, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 746 days.

(21) Appl. No.: 10/017,831

(22) Filed: Dec. 7, 2001

(65) Prior Publication Data
US 2003/0108347 A1  Jun. 12, 2003

(51) Int. Cl.
*H04N 5/225* (2006.01)
(52) U.S. Cl. ................................. 348/207.1
(58) Field of Classification Search ................ 348/207, 348/207.1; 705/21
See application file for complete search history.

(56) References Cited

U.S. PATENT DOCUMENTS

| | | | |
|---|---|---|---|
| 5,418,630 A * | 5/1995 | Mori et al. | 358/472 |
| 5,574,519 A | 11/1996 | Manico et al. | |
| 5,652,936 A * | 7/1997 | Klees et al. | 396/564 |
| 5,664,253 A * | 9/1997 | Meyers | 396/603 |
| 6,001,516 A | 12/1999 | Gasper | |
| 6,206,585 B1 * | 3/2001 | Walter | 396/564 |
| 6,429,923 B1 * | 8/2002 | Ueda et al. | 355/40 |
| 6,644,455 B2 * | 11/2003 | Ichikawa | 194/205 |
| 6,786,655 B2 * | 9/2004 | Cook et al. | 355/40 |
| 2003/0097332 A1 * | 5/2003 | Golasinski et al. | 705/40 |
| 2003/0184820 A1 * | 10/2003 | Han et al. | 358/494 |
| 2004/0109147 A1 * | 6/2004 | Redd et al. | 355/40 |

FOREIGN PATENT DOCUMENTS

JP  04-369959  * 12/1992

OTHER PUBLICATIONS

"A survey of digital minilabs in the USA" by Photoreporter. No. 11, vol. 14, Jun. 11, 2006.*

* cited by examiner

*Primary Examiner*—James M Hannett
(74) *Attorney, Agent, or Firm*—Kathleen Neuner Manne; David A. Novais; Susan L. Parulski

(57) ABSTRACT

A method of digitizing an image using a portable imaging system to produce an image product. The method comprises the steps of: a service provider transporting the portable imaging system from a first location to a second location; the service provider receiving the image to be digitized from a user at the second location; the service provider scanning the image at the second location using the portable imaging system to produce a digital image; the service provider receiving an order request associated with the digital image from the user; and the service provider providing the digital image to a fulfiller for fulfillment of the order request.

27 Claims, 7 Drawing Sheets

METHOD OF USING A PORTABLE SYSTEM FOR CAPTURING IMAGES

CROSS REFERENCE TO RELATED APPLICATION

Reference is made to commonly assigned application U.S. Ser. No. 10/020,802, entitled "A PORTABLE SYSTEM FOR CAPTURING IMAGES AND INFORMATION", and filed on common date herewith in the names of Fredlund et al., and which is assigned to the assignee of this application.

FIELD OF THE INVENTION

The present invention relates generally to image processing, and more particularly, to a portable user accessible system for receiving and storing images for later printing, storing, transmitting, or for the production of an image product and/or service.

BACKGROUND OF THE INVENTION

To enjoy images captured on photographic film using a camera, a user must first have the exposed photographic film processed. This is typically accomplished by the user dropping off the exposed photographic film cartridge at a local retailer, such as a drugstore. At the retailer, the user can interact with the clerk, or use a system which is available for receiving undeveloped film and for delivering prints and the developed film to a customer. Such a system is disclosed in U.S. Pat. No. 5,652,936 (Klees), commonly assigned and incorporated herein by reference. Alternatively, a user can operate a stand alone photofinishing system, such as disclosed in U.S. Pat. No. 5,664,253 (Meyers), commonly assigned and incorporated herein by reference, which dispenses a print of the images.

It is a common desire to share and preserve personal photographs since they provide cherished memories of one's life. Therefore, there are occasions where a copy of the photograph (e.g., a visual image) is needed to share the memories Some people enjoy creating scrapbooks to share and preserve photographs. A scrapbook is a collection of scrapbook pages, each of which is a unique collection of at least photographs, paper crafts, and journaling. In general, each scrapbook page or a group of pages are based on a theme, and all of the components that make up that page(s) are in context with the theme. For example, a scrapbook page having a "holiday" theme would comprise photographs taken during that particular holiday, and paper craft depicting the holiday, for instance, a valentine heart cut out of red construction paper or a purchased die cut. In addition, the person making the scrapbook page would record information about the holiday, including who was shown in the photographs on the page(s) in the form of journaling. All of the components of a scrapbook page are arranged in an aesthetically pleasing manner which best depicts the essence of the theme. The components are typically glued in place, and the assembled scrapbook page is inserted into a scrapbook album. A purpose of making a scrapbook page versus simply placing photographs in a standard photo album is to create a unique, personalized family heirloom which tells a story and will be cherished for a lifetime.

The scrapbook business has grown over the past several years. Today, there are scrapbook specialty stores, magazines devoted to the craft, and a plurality of websites offering on-line merchandise sales and creative tips. However, on the other hand, the type of still photograph included in a scrapbook has gone relatively unchanged over 100 years.

If making a scrapbook page for a scrapbook album, the user may want a copy so as to not use his/her only copy of the photograph for the scrapbook page. Indeed, the resulting scrapbook page may be considered a "photograph" which the user desires a copy of.

Another occasion to need a copy of a photograph is to share treasured moments or heritage. Photographs of relatives may be cherished family photographs which the user desires to share with other members of the family. For example, a parent may send a copy of a photograph of their child's birthday party to a grandparent who lives out of town.

Scanners are available for scanning a photograph for conversion of the photograph for storage in digital form, such as on a floppy disk, compact disc, or memory card. Scanners are available for use with a home personal computer, however, such scanners are expensive, may not be easy to use by the novice computer operator, and may not provide a high resolution scan. In addition, the expense of the computer, scanner, and software is significant. Further, images printed on a home computer are typically inkjet prints, which may or may not include desired archival properties and quality.

Kiosks, such as the Kodak Picture Maker from Eastman Kodak Company, are available at retail locations for making reprints of photographs or prints of digital images. These kiosks generally include a scanner for scanning the photograph and creating a digital copy of the original photograph. However, there may be instances when a user is unable or unwilling to take a photograph to a retail location to make a reprint. For example, the photograph may be a cherished snapshot belonging to another person who is unwilling to be separated from the photograph for fear that the cherished shapshot will be lost or damaged. Or, there may be numerous photographs to be scanned and the user may be limited by time or location to travel to the kiosk. Still further, the holder of the photograph may be a novice user of electromechanical devices, and so may not desire to personally use the kiosk.

Accordingly, a need continues to exist for a method of collecting images from a user and providing the user with reprints or other image products.

SUMMARY OF THE INVENTION

An object of the present invention is to provide a method for collecting and digitizing an image for later production of an image product comprising the collected image.

Another object of the present invention is to provide such a method which can be accomplished in a non-retail or home environment.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a method of digitizing an image. The method comprises the steps of: a service provider transporting a portable imaging system from a first location to a second location; the service provider receiving the image to be digitized from a user at the second location; the service provider scanning the image at the second location using the portable imaging system to produce a digital image; the service provider receiving an order request associated with the digital image from the user, and the service provider providing the digital image to a fulfiller for fulfillment of the order request.

According to another aspect of the invention, there is provided a method of digitizing an image. The method comprises the steps of: transporting a portable imaging system from a first location to a second location; accessing the image to be digitized at the second location; scanning the image at the second location using the portable imaging system to produce a digital image; storing the digital image in memory disposed in the portable imaging system; generating an order request associated with the stored digital image; and transporting the portable imaging system to the first location for fulfillment of the order request.

According to a still further aspect of the invention, there is provided a method of collecting a digitized image. The method comprises the steps of a user providing the digitized image to the service provider at a predetermined location; the service provider copying the digitized image at the predetermined location using a portable kiosk; and the service provider providing the digitized image to a fulfillment service located at a fulfillment location remote from the predetermined location.

According to yet another aspect of the invention, there is provided a method of producing a print from a visual image. The method comprises the steps of: transporting a portable imaging system to a first location; receiving the visual image from a user at the first location; scanning the visual image at the first location using the portable imaging system to produce a digital image; transporting the portable imaging system to a second location remote from the first location; providing the digital image to a fulfiller for generation of the print from the digital image at a third location remote from the first location; and providing the print to the user.

According to still another aspect of the invention, there is provided a method of digitizing an image provided by a user in which at least a portion of a fee associated with producing the digitized image is paid to a service provider by a fulfiller. The method comprises the steps of: the service provider transporting a portable imaging system to a first location; the service provider scanning the image at the first location using the portable imaging system to produce the digitized image; the service provider transmitting the digitized image to the fulfiller located at a second location remote from the first location; and the fulfiller providing a credit to the service provider for some of the fee associated with producing the digitized image using the portable imaging system.

According to still another aspect of the invention, there is provided a method of producing an image product from an image wherein at least a portion of a fee associated with producing the image product is paid to a service provider by a sponsor. The method comprises the steps of: the service provider transporting a portable imaging system from a first location to a predetermined location; the service provider receiving the image from a user at the predetermined location; the service provider producing a digital image of the image using the portable imaging system at the predetermined location; the service provider providing the digital image to a fulfiller for production of the image product; and the service provider receiving a credit from the sponsor for some of the fee associated with producing the image product by the service provider agreeing to use the portable imaging system.

According to yet still another aspect of the invention, there is provided a method of producing an image product from an image. The method comprises the steps of: transporting a portable imaging system from a first location to a second location; receiving the image from a user at the second location; using the portable imaging system at the second location to scan the image to produce a digital image; transporting the portable imaging system to a third location remote from the second location; transmitting the digital image from the portable imaging system to a image producing device disposed at the third location; and producing the image product at the third location.

The present invention provides a method for collecting and digitizing an image for later production of an image product comprising the collected image. The method employs a transportable imaging device which is suitable for use in a home or non-retail environment and configured for the sporadic user who may not be familiar with the computer systems.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
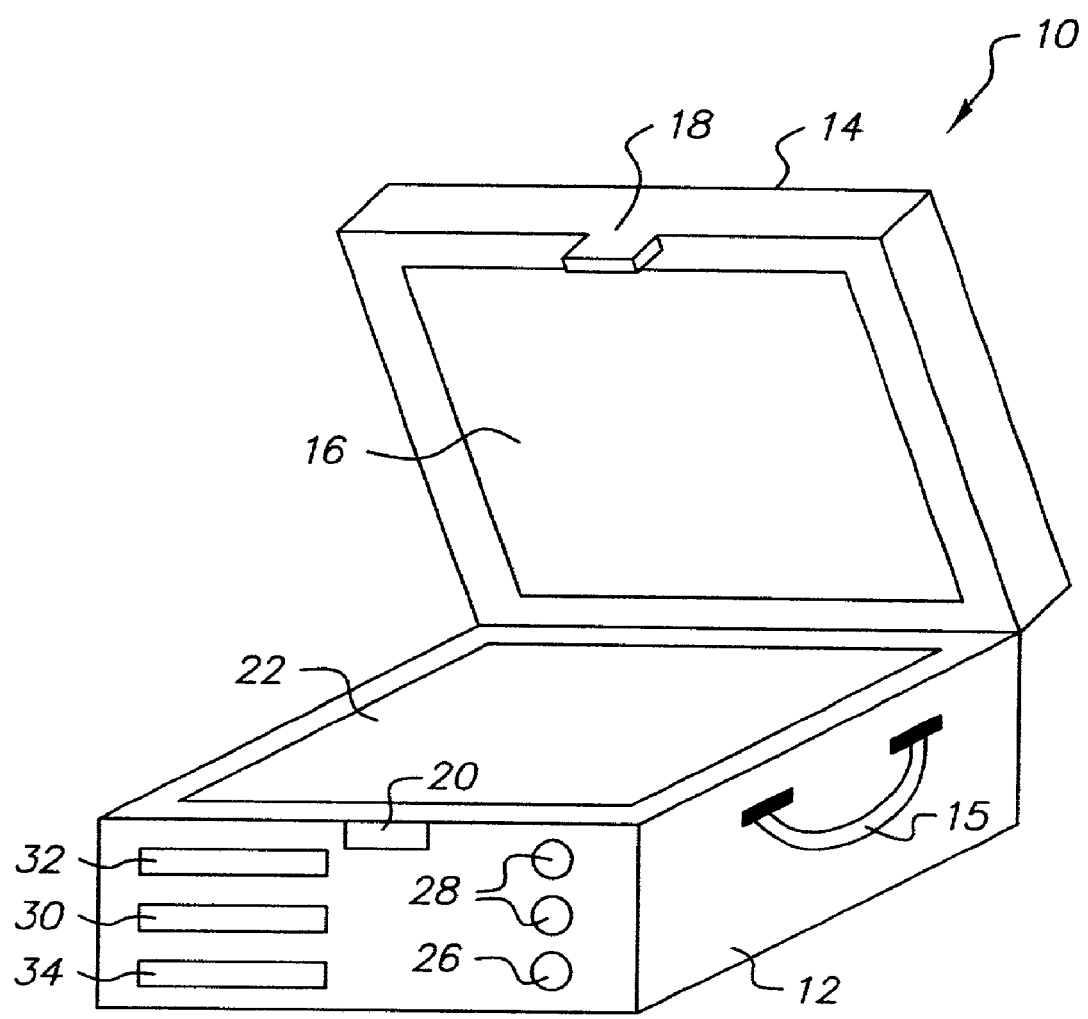
FIG. 1 shows a perspective view generally illustrating a first embodiment of a portable kiosk in accordance with the present invention.

The following is a detailed description of the preferred embodiments of the invention, reference being made to the drawings in which the same reference numerals identify the same elements of structure in each of the several FIGS.

The present invention is directed to a portable imaging system or kiosk which is capable of being carried, and is easily moved.

One embodiment of a portable imaging system in accordance with the present invention is generally illustrated in FIG. 1. Portable imaging system 10, hereinafter referred to as kiosk 10, is preferably of a small size so that it can be readily ported to various locations by a user. Accordingly, kiosk 10 is preferably provided in a form approximately the size and proportions of a laptop computer, a briefcase or a child's lunch box. Kiosk 10 includes a first member 12 and a second 14 movable between an open and closed position.

A handle 15 may assist in porting kiosk 10 between locations. As shown in FIG. 1, disposed on the inside of second member 14 is a display 16, such as a color LCD. Display 16 can be a touchscreen display, whereby a user can provide information and data to kiosk 10, such as an order request or user name. Alternatively, kiosk 10 may comprise a keyboard (not shown) as an input device to provide information and data to image producing device 10.

First and second member 14 are preferably biased to remain in the open position for viewing of display 16 by a user. When in the closed position, a latch 18 and securing member 20 secures first member 12 and second member 14 in the closed position for transport. When in the open position, a scanning area or platen 22 is revealed and accessible onto which an image (such as a photograph or film negative) can be placed and scanned into a resident memory means using a scanner or other scanning device (not shown) housed within first member 12, thereby capturing the image in electronic/digital form to produce a digital image. The memory means can be any known available means, such as a solid state memory card, floppy disc, compact disc, hard drive, discrete circuit board mounted memory IC's, etc., which provides temporary storage of digital data. It may be desired to provide redundant memory means to ensure that no data is lost. The scanner could include any of the available imaging array devices, for example: linear or area; CMOS or CCD. Alternatively, scanning area 22 may be configured as an opening, such as a slot, in either first or second member 12,14, to receive the image to be scanned. The memory means can be disposed in a unit removable from first or second member 12,14.

In operation, the user's image is placed on scanning area 22 and scanning is initiated by an operation member 26, such as a start button, whereby scanning of the image into memory occurs to produce a digital image. After scanning is complete, the image may be displayed on display 16. Once displayed, features of kiosk 10 may be initiated using one or more members 28 to modify the digital image, for example, zoom, rotate, crop. Software disposed in the memory may be employed for modifying the digital image. This modification of the digital image can be accomplished prior to transmitting the digital image for production of an image product.

Kiosk 10 also includes an output port or communication port 30 for communicating over a communication network between kiosk 10 and another device, such as a printer, computer, storage device, or processor, so as to be able to transmit the digital image from kiosk 10 to the other device. Once transmitted, the digital image can be printed, stored, used to produce the image product, or further transmitted. Since kiosk 10 is portable, a feature of the present invention is that kiosk 10 can be transported to the other device to which it is to communicate so that direct communication can occur.

If kiosk 10 does not include output port 30, then kiosk 10 includes an output device for transferring the digital image stored in the memory to a removable media. An example of such an output device is a CD writer for writing a CD.

For added versatility, kiosk 10 may be configured for modular substitution of the image input portion. In such an embodiment, the user may select the appropriate module contingent upon the image source. For example, in addition to the aforementioned scanning of images, images in digital form can be transferred from kiosk 10 to another device in digital form. Further, images and content already in digital form may be input by file transfer (for example, from a CD player, a memory card reader, a slide scanner, or a computer) through a provided interconnection such as a USB port. Accordingly, portable kiosk 10 may further include one or more input ports 32 to receive images which are in digital form. Input port 32 is illustrated in FIG. 1 as an opening in first member 12 for receiving digital images from removable media such as a memory card, compact disc (CD) or other digital storage means.

Kiosk 10 may also include a payment mechanism 34 for receiving payment. An example of a known payment mechanism is a credit card reader, and those skilled in the art will be aware of other known payment mechanisms.

It is understood that if kiosk 10 is electronic input enabled, other forms of content, such as video clips, theme templates, canned (i.e., pre-recorded) sounds, etc., can be incorporated into the presentation. Accordingly, input port 32 may also be configured to receive such other forms of content.

Figure 2:
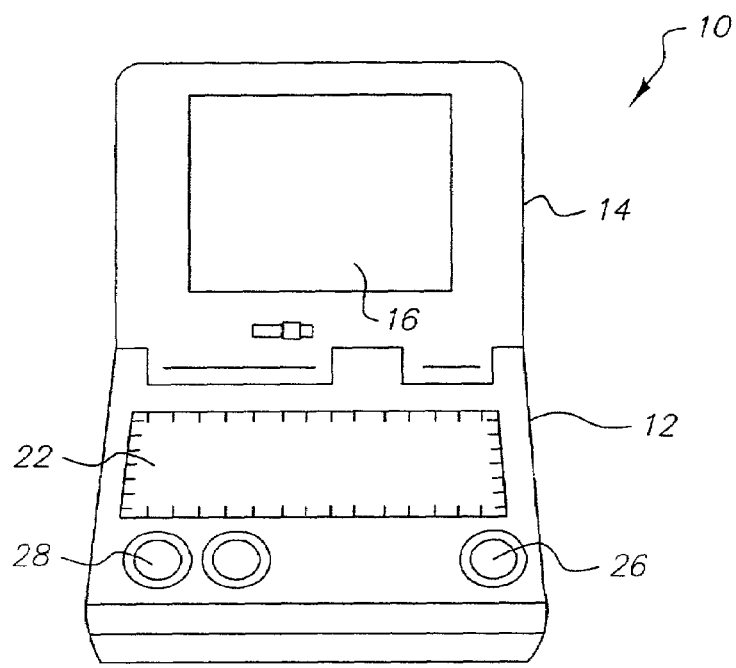
FIG. 2 shows a perspective view generally illustrating a second embodiment of a portable kiosk in accordance with the present invention.
Figure 3:
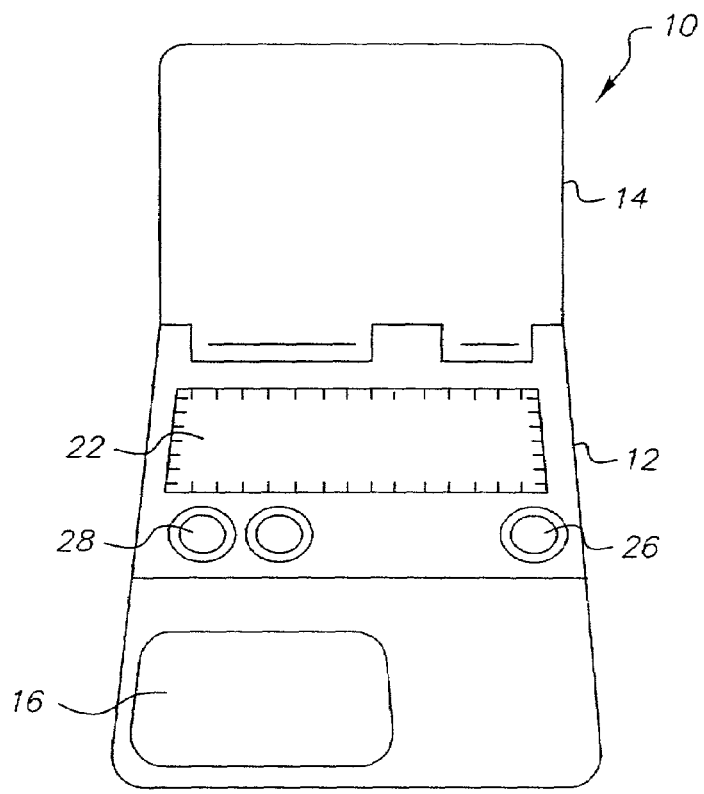
FIG. 3 shows a perspective view generally illustrating a third embodiment of a portable kiosk in accordance with the present invention.
Figure 4:
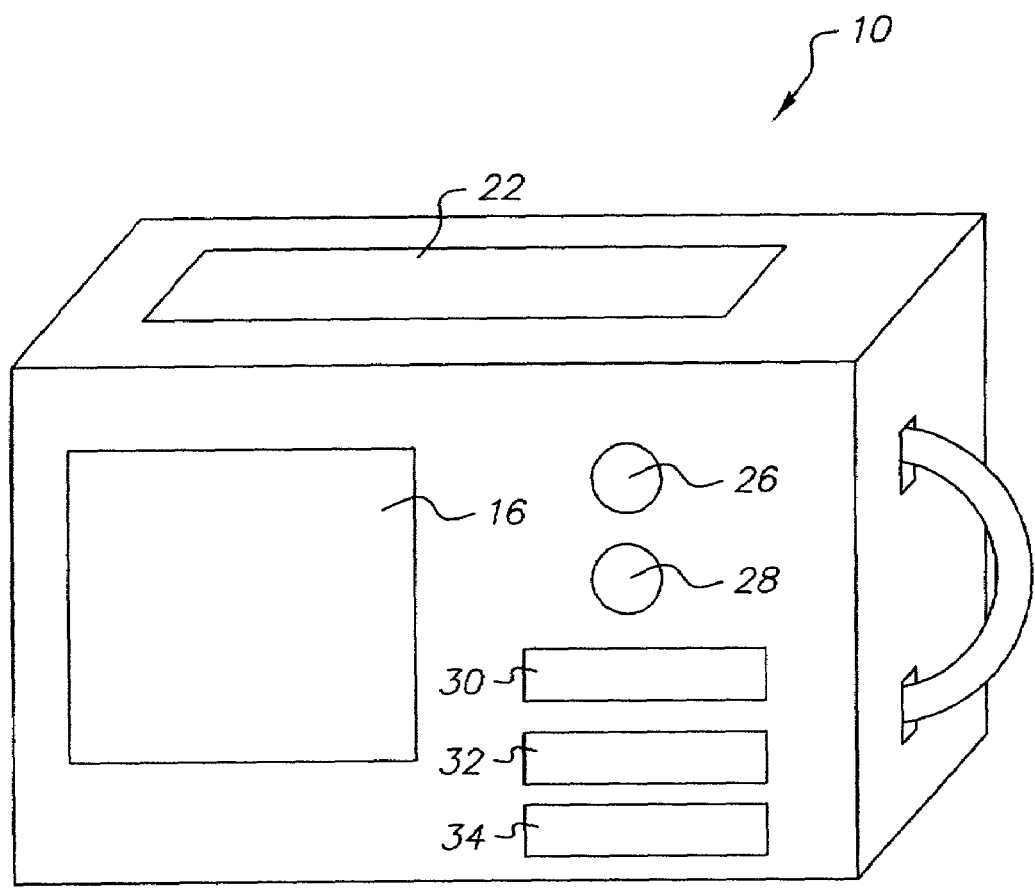
FIG. 4 shows a perspective view generally illustrating a fourth embodiment of a portable kiosk in accordance with the present invention.

A second embodiment of a portable kiosk is generally illustrated in FIG. 2 wherein operation member 26 is disposed proximate scanning area 22. A third embodiment of kiosk 10 is generally illustrated in FIG. 3, wherein display 16 is disposed in first member 12 rather than second member 14. A third embodiment of kiosk 10 is generally illustrated in FIG. 4, wherein kiosk 10 is comprised of a single member with scanning area 22 disposed within the single member. For example, FIG. 4 shows scanning area 22 as a slot for receiving an image. Other embodiments for kiosk 10 may be contemplated.

In operation, user's image is placed on scanning area 22 to digitize the image. Scanning of the image is initiated using operation member 26, whereby the image is scanned into the memory means to produce a digital image. After scanning is complete, the digital image may be displayed on display 16.

If the image to be scanned is a photographic film negative, then kiosk 10 preferably includes a modulated light source for illuminating the image. This light source functions as a display when kiosk 10 is in the open position, and functions as a light source when kiosk 10 is in the closed position. For scanning, it may be desirable to "pre-scan" the image at least once. During such a pre-scan, the display outputs un-modulated white light. After obtaining a pre-scan reduced resolution image, the image may require more or less illumination or require a color change to the illumination source to compensate for exposure, film type, scene illumination, and other variations that effect the film image. In the situation of subject illumination failure, drastic exposure variation occurs within a single film image. An example of this condition occurs when electronic flash is used to illuminate a human face at a close distance. The electronic flash typically overexposes the face and under-exposes the background area, which is usually farther away from the flash. This type of condition appears on negative film as a very dark face and a very light background. Since display 16 is employed as a light source, areas of display 16 can be modulated to reduce or increase intensity and/or color to compensate for over and under exposure conditions. This is accomplished by adapting the image reproduction capabilities of display 16 to spatially match the shapes and patterns of the transparency film image. Once scale and location of the illumination image and the film image are matched/overlaid and the illumination display image can be modulated to compensate exposure variations in the film image.

If desired, prior to scanning, the image may be analyzed, for example, for content of professional logos, or other copyright marks such as described in U.S. Pat. No. 6,001,516 (Gasper), commonly assigned and incorporated herein by reference. Other input means may be included to provide added functionality and utility, one of which may be used to start and end an audio recording through an integral or attached microphone. Anticipated uses of this feature include a narration of the captured event, identification of the individuals and objects in the image, musical scoring, and staged re-creation of what was originally heard when the picture was taken.

Disposed in the memory may be advertisement or instructional information. Such information would be displayable on display 16 when the system is in the open position. For example, instructional information may include how to operate kiosk 10. Or if kiosk 10 is being used to capture digital images for scrapbooking, advertisements for new scrapbooking products may be displayed. Still further, the memory may comprise software for tracking information associated with the scanned digital image, for example the date the image was scanned, or a name to reference the image.

Figure 5:
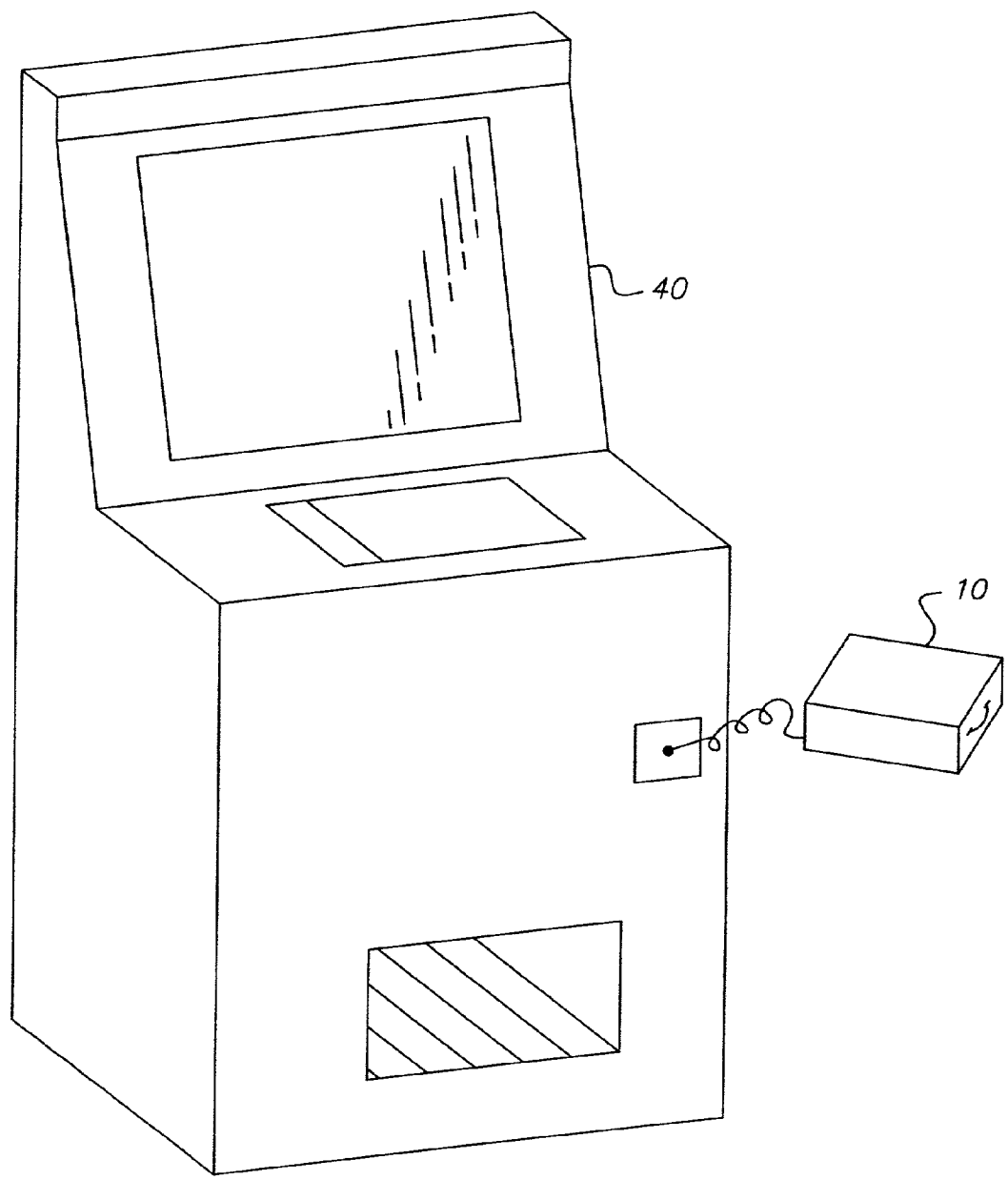
FIG. 5 shows the portable kiosk in accordance with the present invention in communication with a non-portable imaging device.

As configured in FIG. 1, kiosk 10 is a modular, self-contained unit. Because of its size, kiosk 10 is suitable for transporting from location to location. Because of its portability, a user can collect/capture images at various locations, and then transport the images to a location wherein the image product can be produced. Accordingly, in a preferred embodiment, kiosk 10 is configured to communicate with or attach to a non-portable image producing device, such as the Kodak Picture Maker from Eastman Kodak Company located at retail locations, or a retail or wholesale photofinishing lab. FIG. 5 generally illustrates kiosk 10 in communication with a non-portable imaging device 40. It is understood that other communication means may be physically or electrically connected. For example, if hardwired, a USB connection can be employed. Other means include RF, infrared or other wireless communication means.

With its modular size and portability, kiosk 10 lends itself to temporary use, such as being stored, rented, shared, loaned, and borrowed. Therefore, the user of kiosk 10 may be an owner, holder, keeper, renter, and/or borrower of kiosk 10. For example, the user may agree to temporarily use kiosk 10 from an owner or keeper of kiosk 10, such as a rental arrangement from a retailer or mass/food/drug store operator. Because of its size and portability, the user is readily able to transfer portable kiosk 10 to a non-retail location for use, thereby allowing the user to digitize images in the comfort of a non-retail environment, for example his/her home, without the expense of purchasing expensive equipment or learning to use complex software packages.

Once the image(s) has been digitized, the resulting digital image may be stored and converted at a later time to an output form of an image product. The image product can include, for example, a hardcopy print, a Picture CD, Picture Disk, a mug, a tee-shirt, storage on a server, or a display on a computer screen or television monitor. Other image products include a 'slide show' based presentation product. The output media could, for example, be: CD for computer, electronic file for the web, or DVD for TV. The system may also enable "talking albums" as described in U.S. Pat. No. 5,574,519 (Manico et al).

If the image product is a hardcopy print, the print can be produced using known digital printing technologies, including inkjet, thermal dye sublimation, or electrophotography. The image product may be provided by various sources, including the user, owner, holder, keeper, renter, and/or borrower of kiosk 10. Alternatively, a service provider or other third party might be employed to provide the desired output form as a service/business.

Examples of methods of digitizing images using portable kiosk 10 are now discussed.

Figure 6:
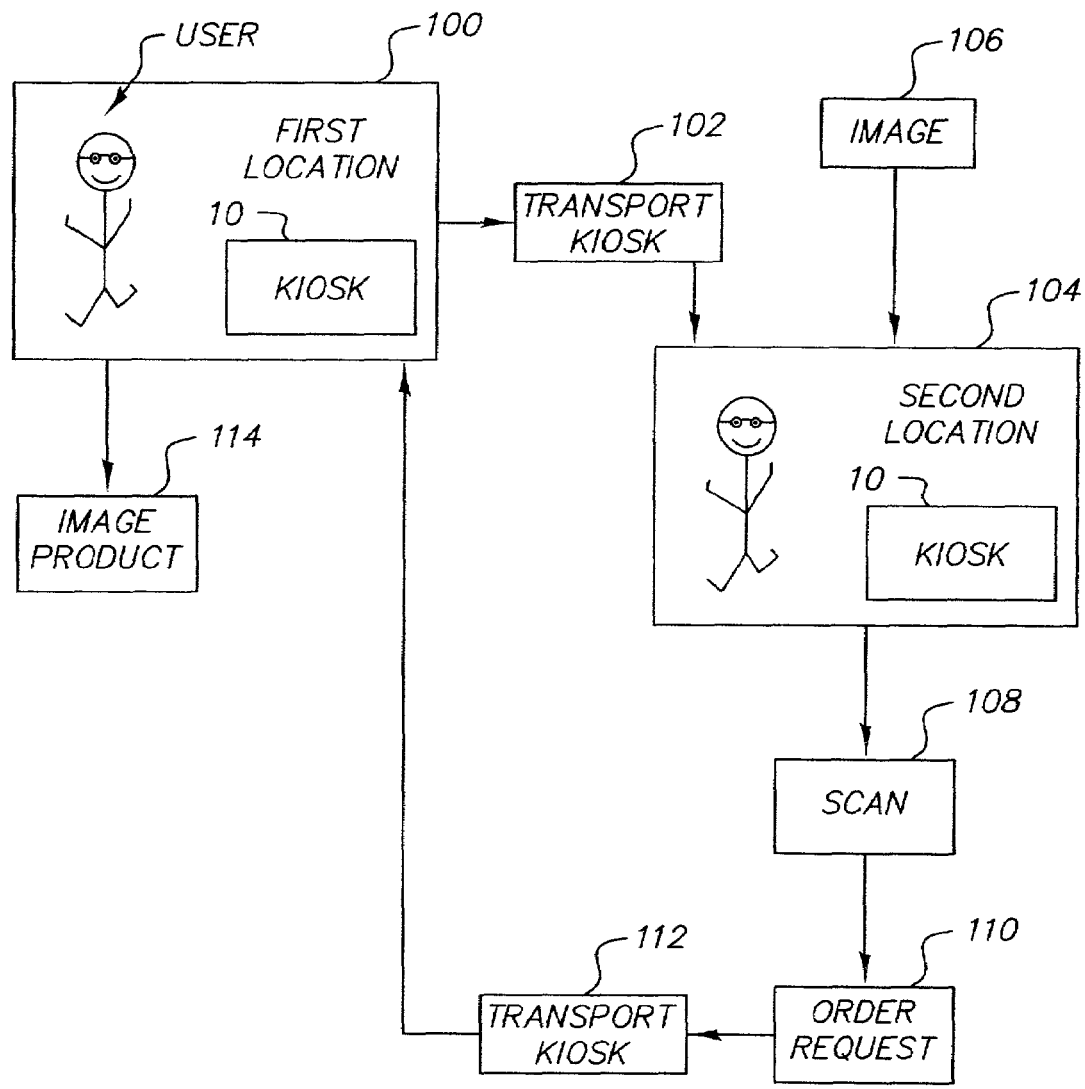
FIG. 6 shows a schematic of a first method in accordance with the present invention.

Rental of Kiosk As indicated above, kiosk 10 lends itself to being rented, shared, loaned or borrowed. For example, it might be rented from a rental service, similar to the rental of a camera from a photography store or the rental of a carpet cleaning system from a hardware store. With such rentals, typically a daily fee is charged for the rental, and a security deposit is required. Referring to FIG. 6, if kiosk 10 is to be rented, the renter (e.g., the user) collects kiosk 10 from a rental service located at a first location (step 100). The user transports (step 102) kiosk 10 to a second location (step 104), remote from the first location, for example, the user's home. At the second location, the user accesses an image to be digitized (step 106). Using kiosk 10 at the second location, the user scans the image to produce a digital image wherein the digital image is stored in memory in kiosk 10 (step 108). The user also generates an order request associated with the digital image (step 110). The order request may be stored in the memory of kiosk 10, or the order request may be in a non-electronic form, such as paper form. The user then returns kiosk 10 to the rental service (at the first location) for fulfillment of the order request (step 112) to produce the image product (step 114).

In the situation wherein the rental service has the appropriate photoprocessing equipment to fulfill the order request (for example, a drug store or wholesale lab), the rental service fulfills the order for the user. In the situation wherein the rental service is unable to fulfill the order request at the first location, the rental service may either transport kiosk 10 to another location for fulfillment or transmit the digital image over a communications network to a fulfiller for fulfillment. Once the order request is fulfilled, the resulting image product is provided to the user through delivery to the user or requiring the user to return to the first location to pick up the image product.

Use of a Service Provider In some situations, the user of kiosk 10 may not have the time or interest to personally use kiosk 10. As such, a service provider may provide a service for the user. That is, a person (e.g., the service provider) would provide and use kiosk 10 as a service to the user. The service provider may or may not be the owner/keeper of kiosk 10. For example, the service provider can rent/borrow kiosk 10 from a rental service as disclosed above, and provide the service to the user.

For illustrative purposes only, the use of a service provider is now more particularly defined with reference to a scrapbook facilitator. It is understood that a service provider can be other individuals, for example, a business operator or a sales representative for a business such as a sales rep for a rental service or a photography store.

As disclosed above, the scrapbook business has grown over the past several years. In some situations, scrapbooking is a social event wherein scrapbookers get together and share ideas (i.e., hereinafter referred to as a scrapbook event). For example, novice scrapbookers often look to others for inspiration when organizing a new page layout while experienced scrapbookers will share their scrapbook page layouts for creative inspiration, and because they are a source of pride for the creator.

A scrapbook facilitator often attends each scrapbook event to offer creative tips and sell merchandise including scissors to cut a variety of patterns, pre-printed patterned paper, paper in all colors of the rainbow, specialty pens, and specialty adhesives. As an additional service to the attendees of the scrapbook event, the scrapbook facilitator may act as a service provider and provide kiosk 10 at the scrapbooker event whereby the scrapbookers can arrange to have their photographs (images) scanned for later production of an image product, such as a print.

Figure 7:
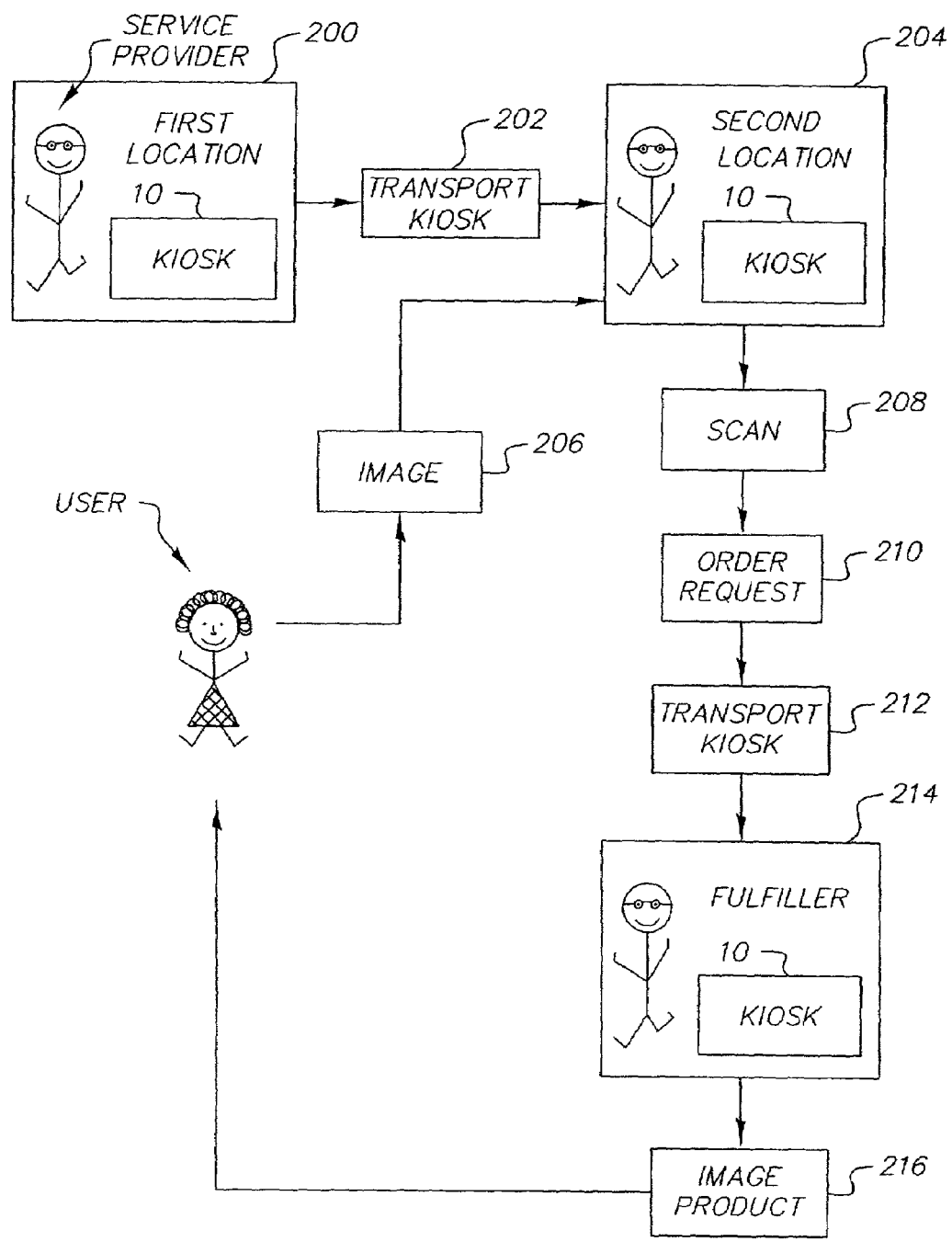
FIG. 7 shows a schematic of a second method in accordance with the present invention.

FIG. 7 provides a schematic of a method in accordance with the present invention wherein a service provider provides a service to a user using kiosk 10.

The service provider transports kiosk 10 from a first location to a second location (step 200, 202, 204). The first location may be, for example, the service provider's home or car, a rental service, or a location where kiosk 10 is stored when not in use. The second location may be, for example, the location of a scrapbook event which could be the user's home or other ad-hoc venue or non-retail location such as a church hall or party house. Still further, the second location could be a retail location such as a hobby or craft store which provides in-store clinics for their customers.

The service provider receives an image to be digitized from a user at the second location (step 206). The service provider scans the image at the second location using kiosk to produce a digital image (step 208). An order request associated with the digital image is received from the user (step 210). The order request may be stored in the memory of kiosk 10, or the order request may be in a non-electronic form, such as paper form. Alternatively, a recorder or other means may be use to audibly capture the order request. The service provider then provides the digital image to a fulfiller for fulfillment of the order request by transporting kiosk 10 to the fulfiller (steps 212 and 214). The fulfiller may be located at the first location, or may be at a third location different than the first and second locations.

When the order request is fulfilled, the image product is provided to the user (step 216), for example using known delivery methods. An electronic message may be sent to the user to notify the user of the completion of the image product and arrange for delivery or pick up of the image product. If the image product comprises an electronic form, for example, the user ordered a digital file of the image, an electronic message can be sent to the user comprising the digital image.

The service provider can provide the digital image to a fulfiller for fulfillment of the order request by methods other than transporting kiosk 10 to the fulfiller. For example, if kiosk 10 includes output port 30, the digital images can be transmitted over a communications network to a fulfiller. Alternatively, if kiosk 10 includes an output device, the digital images can be transferred to a removable media which can be transported to the fulfiller.

It is understood that the image provided to the service provider by the user can be in digital form, wherein input port 32 is employed to receive the image for storage by kiosk 10 for later production of an image product. Therefore, the user would provide the digitized image to the service provider at a predetermined location; the service provider would copy the digitized image at the predetermined location using kiosk 10; and the service provider would provide the digitized image to a fulfillment service located at a fulfillment location remote from the predetermined location.

Payment Payment for the image product may be received from the user. This can be accomplished in several ways. For example, the service provider may accept cash, credit card, or check. If payment is by credit card, the step of receiving payment from the user may be accomplished by inputting credit card information to kiosk 10 using payment mechanism 34. If kiosk 10 comprises scanning area 22, the step of receiving payment from the user can be accomplished by scanning a user check using scanning area 22. Image recognition software may optionally be employed to obtain name/address information from the user check.

Attachment to a non-portable kiosk As indicated above and illustrated in FIG. 5, in a preferred embodiment, kiosk 10 is configured to communicate with or attach to non-portable image producing device 40 such as the Kodak Picture Maker from Eastman Kodak Company located, for example, at retail locations or a retail or wholesale photofinishing lab. The configuration may be, for example, similar to a docking station for a portable computer. Accordingly, when the service provider transports kiosk 10 comprising the user's digital images, the fulfiller at step 214 may be non-portable imaging device 40. Then, once the service provider has completed the steps 200 through 208 (i.e., transporting kiosk 10 from a first location to a second location, receiving the image from the user at the second location, and scanning the image to produce a digital image), then the service provider transports kiosk 10 to a third location remote from the first and second location where non-portable imaging device 40 is located. At this third location, service provider transmits the digital image from kiosk 10 to non-portable imaging device 40 to produce the image product at the third location.

It is understood that the digital image can be transmitted by electrically connecting kiosk 10 to non-portable imaging device 40 at the third location. Alternatively, the digital image can be transmitted by other known means such as electromechanical engagement or wireless communication.

Off-hours use of non-portable kiosk If non-portable imaging device 40 is located at a busy retail location, the service provider might make arrangements with the retail operator of the retail location to use non-portable imaging device 40 during off-hours, for example, non-regular business hours. As such, since non-portable imaging device 40 would not be in use, the service provider would be able to quickly process the order requests. In addition, the retail location would be able to increase use of their image product producing equipment. Accordingly, the image product could be produced at the retail location when the retail location is not open for retail business. This off-hours usage could apply to wholesale labs, central processing labs, or any other location which fulfills order requests for image products.

Sponsor If the service provider is a scrapbook facilitator, the scrapbook facilitator may be associated with a company that sells scrapbooking merchandise wherein for each merchandise sale the scrapbook facilitator might receive a credit or commission. Alternatively, the scrapbook facilitator may be compensated by a credit to purchase scrapbooking merchandise from the company(s) whose products they sell, or a percentage of the sale price of the merchandise sold. The scrapbook facilitator may desire to form an arrangement, agreement, or partnership with an owner/keeper of kiosk 10 to offer an additional service to the user using kiosk 10. With such an arrangement, the owner/keeper of kiosk 10 would be a sponsor for the scrapbook facilitator. Sponsors might be for example, companies associated with scrapbooking merchandise, photofinishers, or companies associated with fulfillment of image products. Sponsors might also include businesses that typically provide imaging services for consumers, such as drug stores, photo finishing outlets, and the like.

Arrangements between the scrapbook facilitator and the sponsor might be similar as with the scrapbooking merchandise. That is, the scrapbook facilitator might receive a credit from the sponsor for some of the fee associated with producing the image product by agreeing to use kiosk 10 at scrapbooking events.

Figure 8:
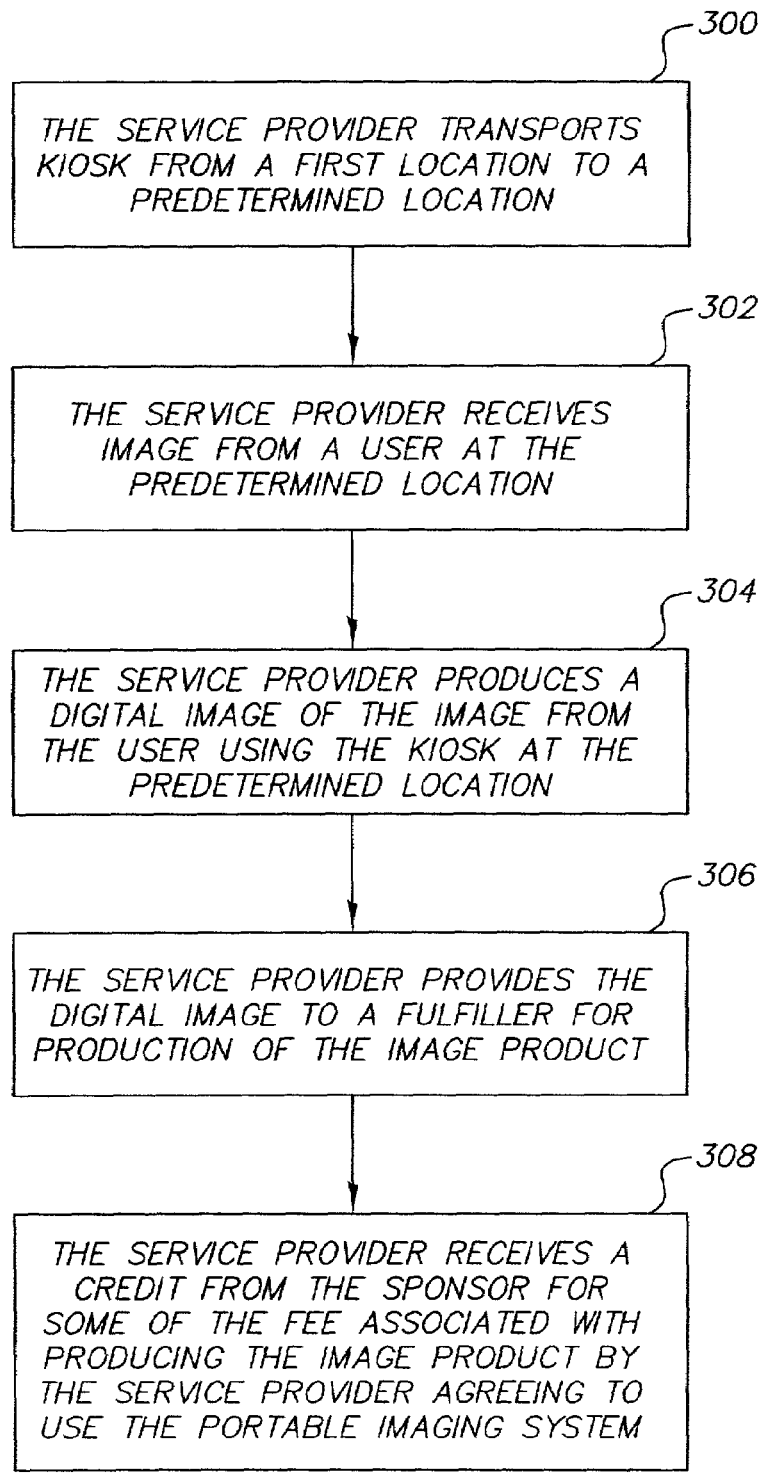
FIG. 8 shows a schematic of a third method in accordance with the present invention.

FIG. 8 illustrates a method of producing an image product from an image wherein at least a portion of a fee associated with producing the image product is paid to a service provider by a sponsor. At step 300, the service provider transports a portable imaging system from a first location to a predetermined location. The service provider receives the image from a user at the predetermined location (step 302). The service provider produces a digital image of the image from the user using kiosk 10 at the predetermined location (step 304). The digital image is provided to a fulfiller by the service provider for production of the image product (step 306). In return for agreeing to use kiosk 10 as a service to user, the service provider receives a credit from the sponsor for some of the fee associated with producing the image product (step 308).

The fulfiller of the image product may or may not be a sponsor. In addition, the image product may be produced at a second location remote from the predetermined location.

At step 304, if the image is a visual image, the service provider produces the digital image by scanning the image using the kiosk 10. If the image received from the user is in digital form, the service provider produces the digital image by copying the image using kiosk 10.

Various business arrangements may be envisioned between a sponsor and service provider. For example, if the service provider is a scrapbook facilitator and the sponsor is a scrapbooking merchandiser, the sponsor may arrange for the scrapbook facilitator to "work toward" owning kiosk 10. That is, after a predetermined timeperiod or predetermined level of sales, the scrapbook facilitator may become the owner of kiosk 10, thereby encouraging sales by the scrapbook facilitator.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 kiosk
12 first member
14 second member
15 handle
16 display
18 latch
20 securing member
22 scanning area; platen
26 operation member
28 member
30 output port
32 input port
34 payment mechanism
40 non-portable imaging device

What is claimed is:

1. A method of digitizing an image, comprising the steps of:
   a service provider transporting a portable imaging device from a first location to a second location, the portable imaging device being of a size small enough for the service provider to carry the portable imaging device by hand;
   the service provider receiving the image to be digitized from a user at the second location;
   the service provider scanning the image at the second location using the portable imaging device to produce a digital image;
   the service provider receiving an order request associated with the digital image from the user; and
   the service provider providing the digital image to a fulfiller for fulfillment of the order request.

2. A method of digitizing an image, comprising the steps of:
   a service provider transporting a portable imaging system from a first location to a second location;
   the service provider receiving the image to be digitized from a user at the second location;
   the service provider scanning the image at the second location using the portable imaging system to produce a digital image;
   the service provider receiving an order request associated with the digital image from the user; and
   the service provider providing the digital image to a fulfiller for fulfillment of the order request by transporting the portable imaging system to the fulfiller.

3. The method of claim 2, further comprising the step of receiving payment from the user.

4. The method of claim 3, wherein the step of receiving payment from the user is accomplished by inputting credit card information to the portable imaging system.

5. The method of claim 3, wherein the portable imaging system comprises a scanning area for scanning the visual image to produce the digital image, and the step of receiving payment from the user is accomplished by scanning a user cheek using the scanning area.

6. The method of claim 2, further comprising the step of the service provider receiving a credit from a sponsor for some of the fee associated with producing an image product associated with the order request by agreeing to use the portable imaging system.

7. A method of digitizing an image, comprising the steps of sequentially:
   transporting a portable imaging system from a first location to a second location;
   accessing the image to be digitized at the second location;
   scanning the image at the second location using the portable imaging system to produce a digital image;
   storing the digital image in memory disposed in the portable imaging system;
   generating an order request associated with the stored digital image; and
   transporting the portable imaging system to the first location for fulfillment of the order request.

8. A method of producing a print from a visual image, comprising the steps of:
   transporting a portable imaging system to a first location;
   receiving a hard copy document from a user at the first location, said hard copy document containing the visual image;
   scanning the hard copy document at the first location using the portable imaging system to produce a digital image;
   transporting the portable imaging system to a second location remote from the first location;
   providing the digital image to a fulfiller for generation of the print from the digital image at a third location remote from the first location; and
   providing the print to the user.

9. A method of digitizing an image provided by a user, and producing an image product from the digitized image, in which at least a portion of a fee associated with producing the digitized image is paid to a service provider by a fulfiller, comprising the steps of:
   the service provider transporting a portable imaging system to a first location, the portable imaging device being of a size small enough for the service provider to carry the portable imaging device by hand;

the service provider scanning the image at the first location using the portable imaging device to produce the digitized image;

the service provider transmitting the digitized image to the fulfiller located at a second location remote from the first location; and the fulfiller producing the image product and providing a credit to the service provider for some of the fee associated with producing the digitized image using the portable imaging device.

10. A method of producing an image product from an image wherein at least a portion of a fee associated with producing the image product is paid to a service provider by a sponsor, comprising the steps of:

the service provider transporting a portable imaging system from a first location to a predetermined location, the portable imaging device being of a size small enough for the service provider to carry the portable imaging device by hand;

the service provider receiving the image from a user at the predetermined location;

the service provider producing a digital image of the image using the portable imaging device at the predetermined location;

the service provider providing the digital image to a fulfiller for production of the image product;

the fulfiller producing the image product, and not being the sponsor; and the service provider receiving a credit from the sponsor for some of the fee associated with producing the image product by the service provider agreeing to use the portable imaging device.

11. The method of claim 10, wherein the image product is produced at a second location remote from the predetermined location.

12. The method of claim 10, wherein the service provider produces the digital image by scanning the image using the portable imaging system.

13. The method of claim 10, wherein the image received from the user is in digital form, and the service provider produces the digital image by copying the image using the portable imaging system.

14. A method of producing an image product from an image, comprising the steps of:

transporting a portable imaging system from a first location to a second location;

receiving a hard copy document from a user at the second location, said hard copy document containing the visual image;

using the portable imaging system at the second location to scan the hard copy document to produce a digital image;

transporting the portable imaging system to a third location remote from the second location;

transmitting the digital image from the portable imaging system to a image producing device disposed at the third location; and producing the image product at the third location.

15. The method of claim 14, wherein the digital image is transmitted by electrically connecting the portable imaging system to the image producing device at the third location.

16. The method of claim 14, wherein the digital image is transmitted by electro-mechanical engagement or wireless communication.

17. The method of claim 14, further comprising the step of providing the image product to the user.

18. The method of claim 17, wherein the step of providing the image product to the user is accomplished by sending the image product to the user using a third-party delivery service.

19. The method of claim 14, further comprising the step of sending an electronic message to the user comprising the digital image.

20. A method of producing an image product from an image, comprising the steps of:

transporting a portable imaging system from a first location to a second location;

receiving the image from a user at the second location;

using the portable imaging system at the second location to scan the image to produce a digital image;

transporting the portable imaging system to a third location remote from the second location;

transmitting the digital image from the portable imaging system to a image producing device disposed at the third location; and producing the image product at the third location, wherein the third location is a retail location, and the step of producing the image product at the third location is accomplished when the retail location is not open for retail operation.

21. A computer storage product having at least one computer storage medium having instructions stored therein causing one or more computers to perform the method of claim 1.

22. A method of producing a print from a visual image, comprising the steps of:

transporting a hand-carriable imaging system to a first location;

receiving a hard copy document from a user at the first location, said hard copy document containing the visual image;

scanning the hard copy document at the first location using the hand-carriable imaging system to produce a digital image; and transporting the hand-carriable imaging system to a second location remote from the first location.

23. A method of digitizing an image, comprising the steps of sequentially:

transporting a hand-carriable imaging system from a first location to a second location;

accessing the image to be digitized at the second location;

scanning the image at the second location using the hand-carriable imaging system to produce a digital image;

storing the digital image in memory disposed in the hand-carriable imaging system; and generating an order request associated with the stored digital image.

24. The method of claim 1, further comprising:
recording audio input corresponding to the image in the portable imaging device.

25. The method of claim 2, further comprising:
recording audio input corresponding to the image in the portable imaging system.

26. The method of claim 7, further comprising:
recording audio input corresponding to the image in the portable imaging system.

27. The method of claim 23, further comprising:
recording audio input corresponding to the image in the portable imaging system.

* * * * *

UNITED STATES PATENT AND TRADEMARK OFFICE
CERTIFICATE OF CORRECTION

| | | |
|---|---|---|
| PATENT NO. | : 7,564,480 B2 | Page 1 of 1 |
| APPLICATION NO. | : 10/017831 | |
| DATED | : July 23, 2009 | |
| INVENTOR(S) | : Loretta E. Allen et al. | |

It is certified that error appears in the above-identified patent and that said Letters Patent is hereby corrected as shown below:

Column 12, line 24          In Claim 5, delete "cheek" and insert -- check --, therefor.

Signed and Sealed this

Fifth Day of January, 2010

David J. Kappos
*Director of the United States Patent and Trademark Office*